US008396477B2

(12) United States Patent
Kanazawa et al.

(10) Patent No.: US 8,396,477 B2
(45) Date of Patent: Mar. 12, 2013

(54) RADIO COMMUNICATION BASE STATION DEVICE AND RADIO COMMUNICATION METHOD TO SHORTEN A SUSPENSION TIME OF AN MBMS SERVICE WHEN A USER EQUIPMENT MOVES FROM A SINGLE FREQUENCY NETWORK AREA TO A NON-SINGLE FREQUENCY NETWORK AREA

(75) Inventors: Takeshi Kanazawa, Kanagawa (JP); Akito Fukui, Kanagawa (JP)

(73) Assignee: Panasonic Corporation, Osaka (JP)

(*) Notice: Subject to any disclaimer, the term of this patent is extended or adjusted under 35 U.S.C. 154(b) by 630 days.

(21) Appl. No.: 12/532,393

(22) PCT Filed: Mar. 21, 2008

(86) PCT No.: PCT/JP2008/000678
§ 371 (c)(1),
(2), (4) Date: Sep. 21, 2009

(87) PCT Pub. No.: WO2008/129812
PCT Pub. Date: Oct. 30, 2008

(65) Prior Publication Data

US 2010/0113030 A1 May 6, 2010

(30) Foreign Application Priority Data

Mar. 23, 2007 (JP) ................................ 2007-077777
Apr. 16, 2007 (JP) ................................ 2007-107038

(51) Int. Cl.
*H04W 36/00* (2009.01)

(52) U.S. Cl. ........ 455/436; 455/437; 455/438; 455/439; 455/440; 455/441; 455/442; 455/443; 455/444; 455/450; 370/331

(58) Field of Classification Search .......... 455/436–444, 455/450; 370/331
See application file for complete search history.

(56) References Cited

U.S. PATENT DOCUMENTS 6,230,013 B1 * 5/2001 Wallentin et al. ............. 455/436
2008/0026691 A1 * 1/2008 Gao ................................. 455/7
2010/0069064 A1 * 3/2010 Hannu et al. .................. 455/434

OTHER PUBLICATIONS

International Search Report dated Jul. 1, 2008.

(Continued)

*Primary Examiner* — Amancio Gonzalez
(74) *Attorney, Agent, or Firm* — Dickinson Wright PLLC

(57) ABSTRACT

Disclosed are a radio communication base station device and a radio communication method which can reduce the interruption time of a service being received by UE while suppressing a resource consumption amount in an SFN area when the UE performs a handover from the SFN area to a non-SNF area. An MBMS reception request identification unit (127) judges an RRC message inputted from the UE (100). If an MBMS reception request is contained, an MBMS reception request is transmitted to an MBMS reception request storage unit (124). Moreover, when the RRC message from the UE (100) contains an adjacent cell reception quality measurement result, a handover decision unit (126) judges whether to perform a handover to the adjacent cell. The MBMS reception request storage unit (124) stores the MBMS reception request outputted from the MBMS reception request identification unit (127). When the handover decision unit (126) which has decided the handover requests for transmission of an MBMS reception request, the MBMS reception request storage unit (124) transmits the MBMS reception request to an MME (140).

3 Claims, 16 Drawing Sheets

OTHER PUBLICATIONS

3GPP TSG-RAN WG3#55 Tdoc, "MBMS Service continuity when moving between SFN and non-SFN zones," R3-070063, Feb. 2007, pp. 1-6.

3GPP TSG RAN WG3 Meeting #57bis, "Consideration on mobility procedure from MC-PTM," R3-071885, Panasonic, Oct. 2007, pp. 1-3.

3GPP TSG RAN WG3 Meeting #57, "MBMS service continuity," R3-071497, Ericsson, Aug. 2007, pp. 1-3.

3GPP TS 36.300 V8.3.0 (Dec. 2007), 3rd Generation Partnership Project; Technical Specification Group Radio Access Network, "Evolved Universal Terrestrial Radio Access (E-UTRA) and Evolved Universal Terrestrial Radio Access Network (E-UTRAN)," Overall description, Stage 2, Mar. 2007, pp. 1-120.

3GPP TR R3.018 V1.0.0 (Oct. 2007), 3rd Generation Partnership Project; Technical Specification Group Radio Access Network, "Evolved UTRA and UTRAN, Radio Access Architecture and Interfaces," Feb. 2007, pp. 1-138.

3GPP TR R3.018 V0.1.0 (Jan. 2006), 3rd Generation Partnership Project; Technical Specification Group Radio Access Network, "Evolved UTRA and UTRAN, Radio Access Architecture and Interfaces," Jan. 2006, pp. 1-18.

* cited by examiner

RADIO COMMUNICATION BASE STATION DEVICE AND RADIO COMMUNICATION METHOD TO SHORTEN A SUSPENSION TIME OF AN MBMS SERVICE WHEN A USER EQUIPMENT MOVES FROM A SINGLE FREQUENCY NETWORK AREA TO A NON-SINGLE FREQUENCY NETWORK AREA

TECHNICAL FIELD

The present invention relates to a radio communication base station apparatus and a radio communication method for providing a multimedia broadcast/multicast service ("MBMS").

BACKGROUND ART

An LTE/SAE (Long Term Evolution/System Architecture Evolution) system is a next-generation mobile communication system which has evolved from UMTS (Universal Mobile Telecommunications System) and aims at providing further improved mobile communication services.

The LTE/SAE system provides MBMS. MBMS is a further developed service which not only broadcasts multimedia data but also multicasts multimedia to users who subscribe to corresponding services. The MBMS provides, for example, a news channel, music channel, movie channel or the like.

As an MBMS transfer method in an LTE/SAE system, a method referred to as "single frequency network ("SFN") transfer" is currently studied as a standard candidate. In an SFN transfer, a plurality of base stations belonging to the same SFN area are synchronized with each other across cells to transmit data regardless of the presence or absence of users, thereby improving received quality for the users through inter-cell diversity combining. The architecture and processing procedure of SFN transfer are disclosed in Non-Patent Documents 1, 2 and 3.

FIG. 1 shows an example of providing MBMS in the 3GPP (3rd Generation Partnership Project) LTE/SAE system. As shown in FIG. 1, one MBMS service area is formed with an SFN area where a service is provided through SFN transfer (Multi Cell Transmission: MCT) and a non-SFN area where a service is provided through multicast/unicast transfer other than the SFN transfer. Terminals (User Equipment: UE) receive the same service in any one of two different transfer modes, depending on to which area the terminals belong.

The operating mode of a UE is generally classified into the idle state and the active state. A UE in an idle state is managed by a core network ("CN") in units of location registration areas, and the CN cannot identify to which cell in a location registration area the UE belongs. On the other hand, as for a UE in an active state, a radio communication base station apparatus (Evolved NodeB: eNB) and CN can identify the location of the UE in units of cells.

An MBMS allows services to be received in any of an idle state and active state, and a UE in an idle state can correctly receive desired MBMS by receiving MBMS control information broadcast by an eNB.

Next, a case where a UE in an idle state moves from an SFN area to a non-SFN area, will be explained using FIG. 2.

While receiving a certain service in an SFN area, the UE in an idle state performs cell reselection and moves from the SFN area to the non-SFN area (step ("ST") 11).

Since a desired service is not constantly provided in the non-SFN area, the UE, which has detected that the service is not provided from MBMS control information broadcast by an eNB, transits to an active state and sends a MBMS reception request to a mobility management entity ("MME") so as to request the CN to provide the service (ST12).

The MME having received the MBMS reception request executes MBMS bearer setting procedure between the eNB, to which the UE is connected, and a multicast user plane entity ("mUPE"), which provides the service, and establishes an MBMS bearer to provide the service (ST13).

Through ST13, the MBMS bearer to provide the service is established between the mUPE and the eNB, and the mUPE transfers the service requested by the UE to the established MBMS bearer (ST14).

When the non-SFN area supports unicast transfer, the MBMS bearer between the mUPE and the eNB in ST13 is a UE dedicated point-to-point ("PTP") bearer, and, when the non-SFN area supports multicast transfer, the MBMS bearer is a point-to-multipoint ("PTM") bearer common in the non-SFN area. When the UE moves within the non-SFN area, an MBMS bearer is reestablished for the destination eNB in any bearers.

Next, a case will be explained using FIG. 3 where a UE in an idle state transits to an active state and then moves from the SFN area to the non-SFN area. An eNB located on a boundary of the SFN area includes information indicating the boundary of the SFN area in broadcast information and transmits the result (ST21).

The UE in an idle state detects from the broadcast information that the UE is approaching the boundary of the SFN area, transits to an active state and sends an MBMS reception request to the MME (ST22), and the MME sets the requested MBMS bearer between the mUPE and eNB (ST23).

The mUPE transfers the service requested by the UE to the MBMS bearer, and the UE receives a desired service from the newly set MBMS bearer (ST24).

The UE in an active state normally measures received quality of neighboring cells and reports the measurement result to the eNB periodically or on an event-by-event basis. Here, suppose that the UE has moved to the vicinity of the boundary with a neighboring cell. The eNB, which has received the neighboring cell received quality measurement result reported from the UE, detects that the UE is located near the boundary with a certain neighboring cell.

The eNB instructs the UE to move to the detected neighboring cell, and the UE performs handover to the instructed neighboring cell (ST25).

When the handover is completed, the destination eNB sends a path switching request to the mUPE so as to switch the MBMS bearer established with the source eNB in ST23 to the destination eNB (ST26). The mUPE, which has received the path switching request, switches the MBMS bearer to the destination eNB, transfers the service desired by the UE to the switched MBMS bearer and the UE receives the service from the switched MBMS bearer (ST27).

Non-Patent Document 1: 3GPP TS 36.300 "3rd Generation Partnership Project; Technical Specification Group Radio Access Network, Evolved Universal Terrestrial Radio Access (E-UTRA) and Evolved Universal Terrestrial Radio Access Network (E-UTRAN), Overall description, Stage 2", 2007-03

Non-Patent Document 2: 3GPP TR R3.018 "3rd Generation Partnership Project; Technical Specification Group Radio Access Network, Evolved UTRA and UTRAN, Radio Access Architecture and Interfaces", 2007-02

Non-Patent Document 3: 3GPP TSG-RAN WG3#55 Tdoc R3-070063 "MBMS Service continuity when moving between SFN and non-SFN zones", 2007-02

DISCLOSURE OF INVENTION

Problems to be Solved by the Invention

However, the above described MBMS providing method involves the following problems. That is, in the case of a UE in an idle state that goes out of an SFN area, in the destination non-SFN area, the UE transits to an active state and sends an MBMS reception request to a network, and the network side suspends the transmission of services until the setting of the MBMS bearer for the service is completed, which increases the service suspension time.

Furthermore, when the UE in an idle state located on the boundary of the SFN area transits to an active state and then goes out of the SFN area, the UE prepares an MBMS bearer for non-SFN transfer before handover, and therefore service suspension does not occur before and after the handover, but redundant MBMS bearers of SFN transfer and non-SFN transfer are set for the same service until the handover is actually performed, which results in consuming radio resources in vain. Moreover, even if the UE is located on the boundary of the SFN area, the UE may not necessarily perform handover to the non-SFN area, and therefore, in such a case, the prepared MBMS bearer for non-SFN transfer itself is useless.

It is therefore an object of the present invention to provide a radio communication base station apparatus and a radio communication method for, when a UE performs handover from an SFN area to a non-SFN area, shortening a suspension time of the service being received by the UE while suppressing the amount of radio resources consumed in the SFN area.

Means for Solving the Problem

The radio communication base station apparatus of the present invention adopts a configuration including: a storing section that stores a multimedia broadcast/multicast service ("MBMS") reception request transmitted from a user; and a handover determining section that judges whether or not to perform handover from a single frequency network area of the user to a non-single frequency network area, and, when it is judged that handover is performed, allows a core network to send the stored MBMS reception request.

The radio communication method of the present invention includes: a storing step of storing a multimedia broadcast/multicast service ("MBMS") reception request transmitted from a user in a radio communication base station apparatus; and a handover determining step of judging whether or not to perform handover from a single frequency network area of the user to a non-single frequency network area, and, when it is judged that handover is performed, allowing a core network to send the stored MBMS reception request.

Advantageous Effects of Invention

According to the present invention, when a UE performs handover from an SFN area to a non-SFN area, a suspension time of the service being received by the UE can be shortened while suppressing the amount of radio resources consumed in the SFN area.

BEST MODE FOR CARRYING OUT THE INVENTION

Embodiments of the present invention will be explained below in detail with reference to the accompanying drawings.

Embodiment 1

Figure 1:
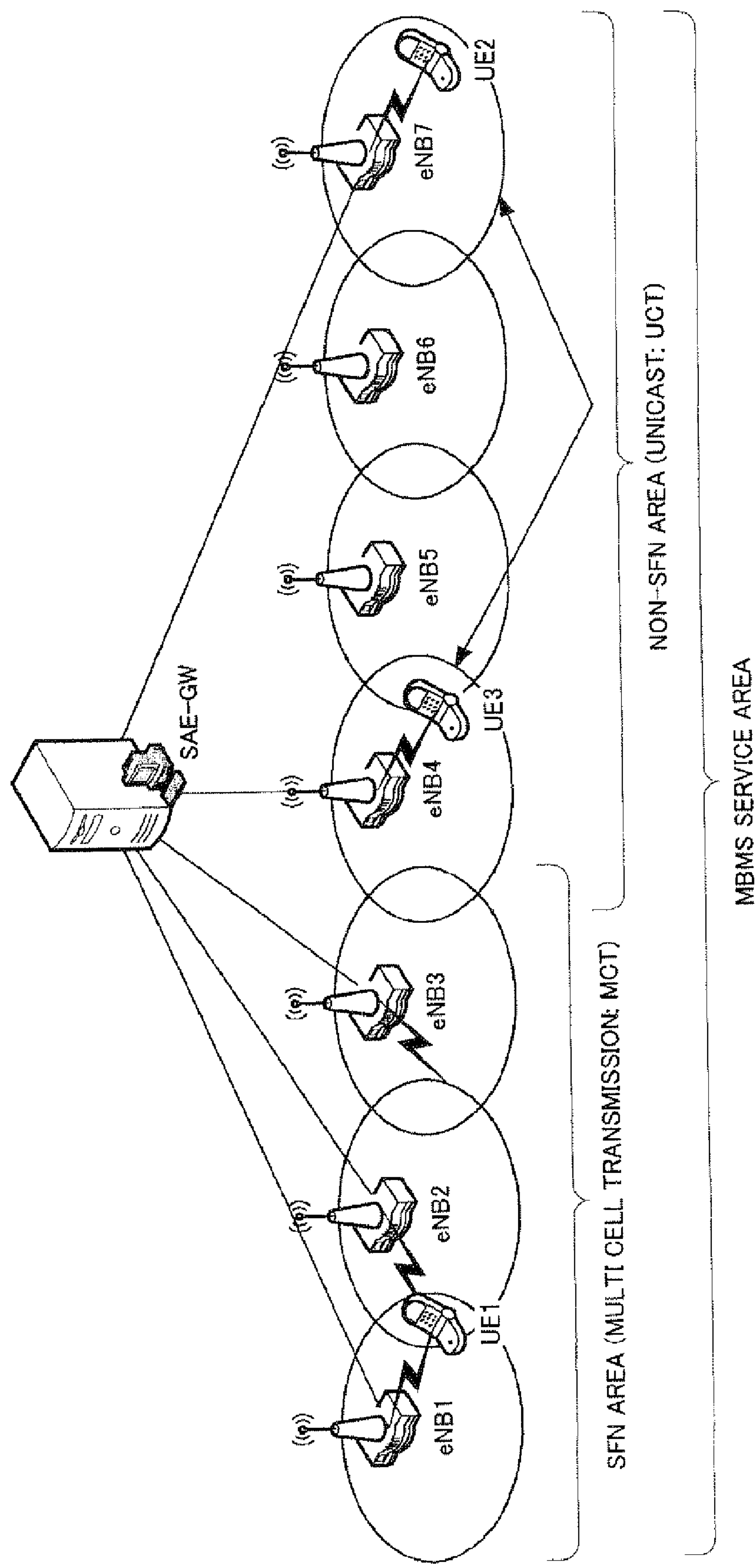
FIG. 1 is a network diagram showing an example of providing MBMS in a 3GPP LTE/SAE system.
Figure 2:
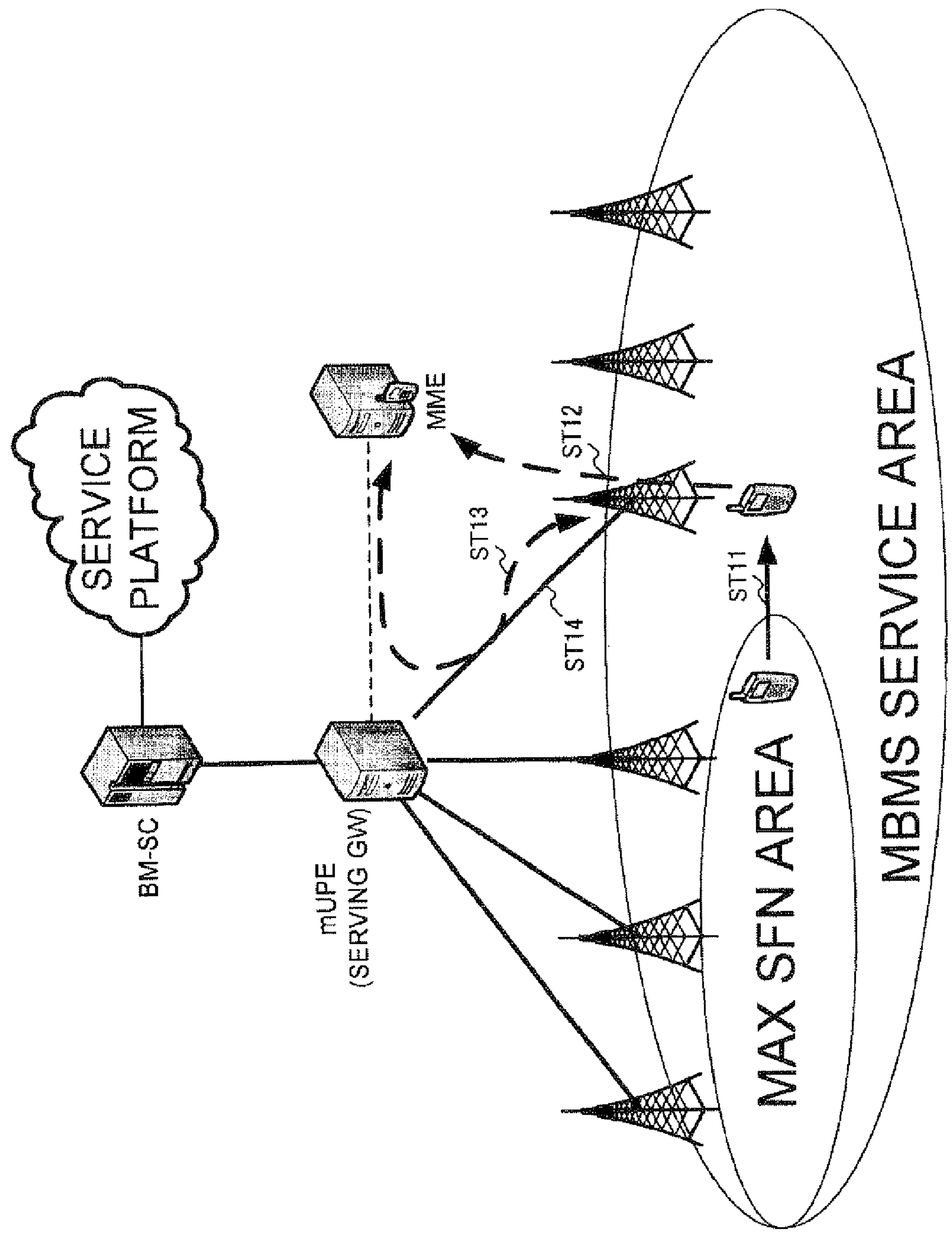
FIG. 2 is a sequence diagram showing a procedure of handover from an SFN area to a non-SFN area in an idle state.
Figure 3:
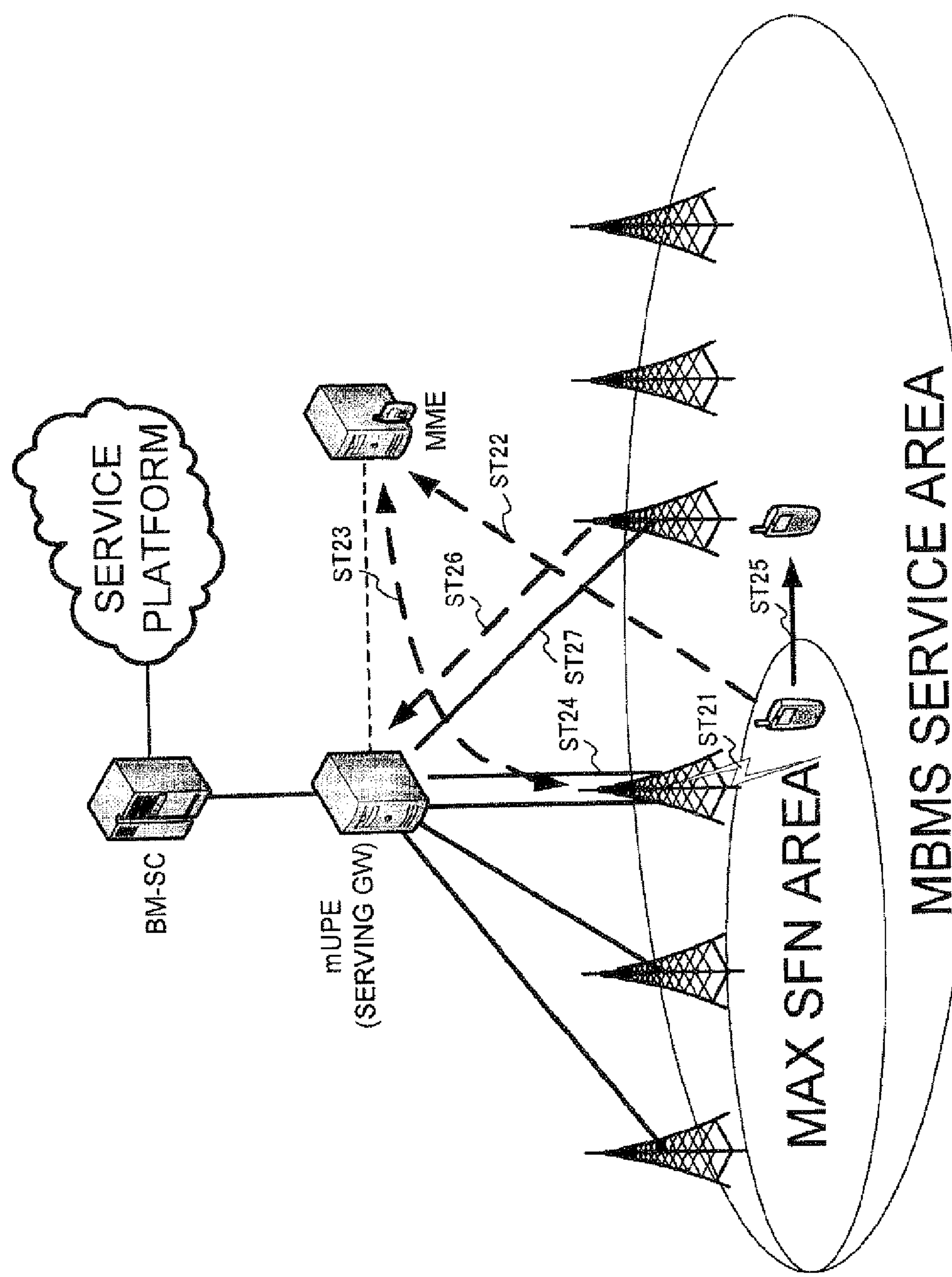
FIG. 3 is a sequence diagram showing a procedure of handover from an SFN area to a non-SFN area in the case of transition from an idle state to an active state.
Figure 4:
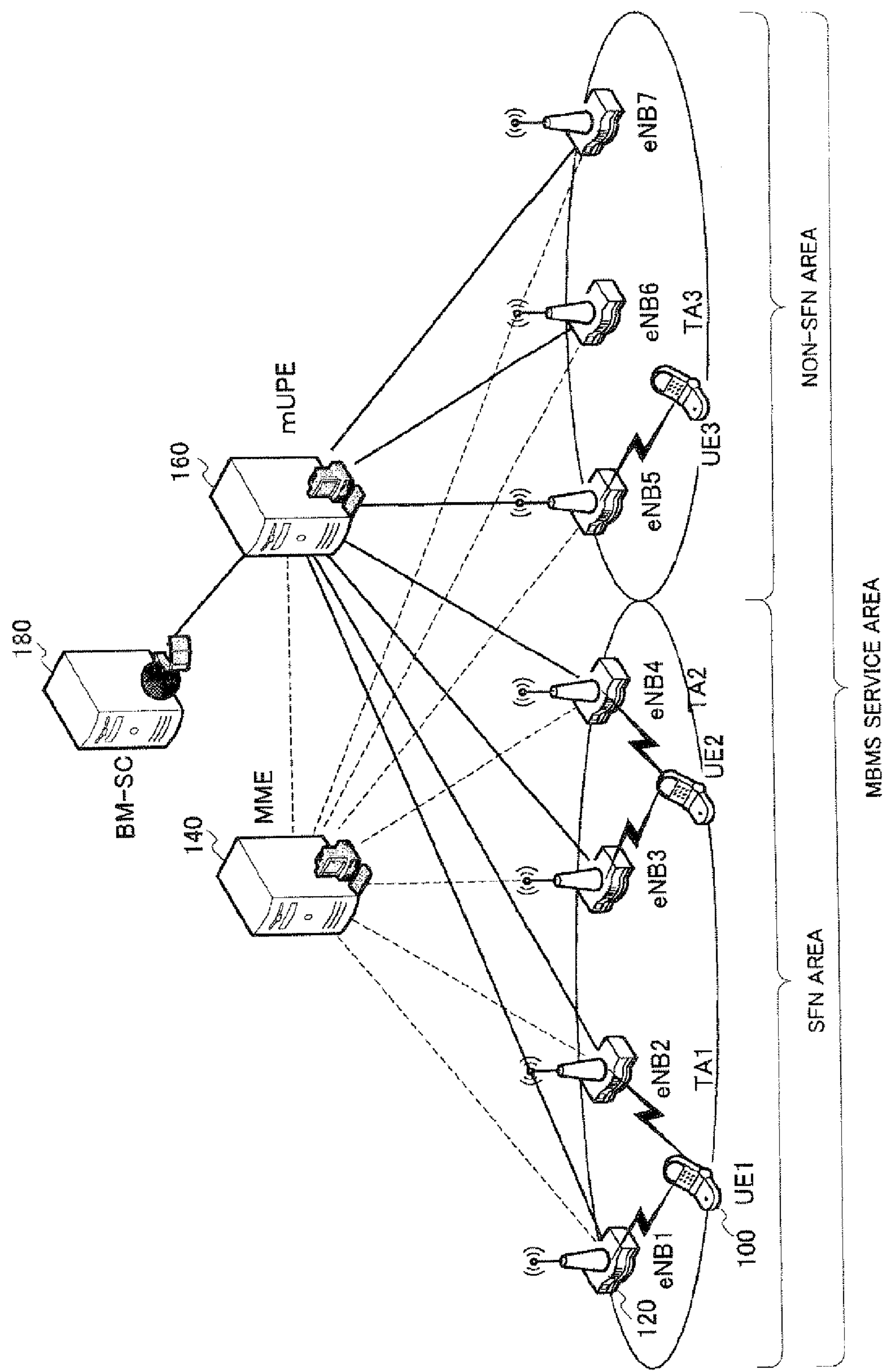
FIG. 4 shows a network configuration according to Embodiment 1 of the present invention.

FIG. 4 shows a network configuration according to Embodiment 1 of the present invention. The network shown in FIG. 4 is provided with terminal (User Equipment: UE) 100, radio base station apparatus (Evolved NodeB: eNB) 120, mobility management entity (MME) 140, multicast user plane entity (mUPE) 160 and broadcast/multicast service center ("BM-SC") 180. Furthermore, eNB 120, MME 140 and mUPE 160 are connected to each other via an IP network.

eNB 120 is responsible for allocation and management of radio resources, receives information transferred from a physical layer of UE 100 via an uplink, or reversely, transfers data to UE 100 via a downlink. eNB 120 plays a role of an access point in a radio access network for UE 100.

MME 140 performs signaling regarding an MBMS reception request with UE 100. Furthermore, MME 140 performs signaling regarding a setting, correction and release of an MBMS bearer between mUPE 160 and eNB 120.

mUPE 160 transfers MBMS data to eNB 120 according to the setting of the MBMS bearer. mUPE 160 stores an MBMS-related context.

BM-SC 180 is located between an MBMS content server (not shown) and mUPE 160, and transfers information on a session type, start and end of a service and MBMS data to mUPE 160. MME 140, mUPE 160 and BM-SC 180 form a CN.

Figure 5:
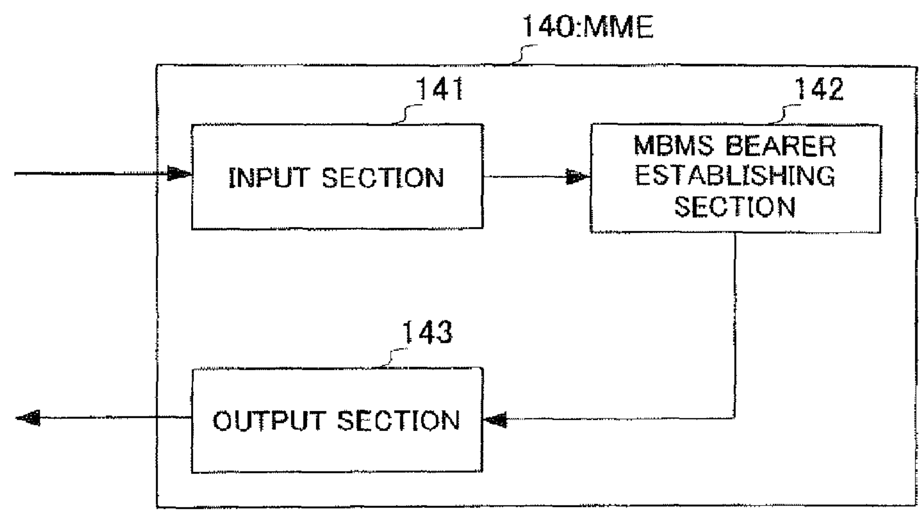
FIG. 5 is a block diagram showing a configuration of the MME shown in FIG. 4.

FIG. 5 is a block diagram showing a configuration of MME 140 shown in FIG. 4. In FIG. 5, input section 141 reports signals received from mUPE 160 and eNB 120, to MBMS bearer establishing section 142.

Upon acquiring an MBMS reception request from UE 100 received via eNB 120 to which UE 100 is currently connected, MBMS bearer establishing section 142 performs processing for establishing an MBMS bearer between mUPE 160 and eNB 120 based on the acquired MBMS reception request. MBMS bearer establishing section 142 identifies mUPE 160 that provides the service from a service identifier included in the MBMS reception request, and performs signaling to mUPE 160 and eNB 120 via output section 143 so as to establish an MBMS bearer with eNB 120 to which UE 100 is currently connected.

Output section 143 sends, to mUPE 160 and eNB 120, a control signal to establish the MBMS bearer outputted from MBMS bearer establishing section 142.

Figure 6:
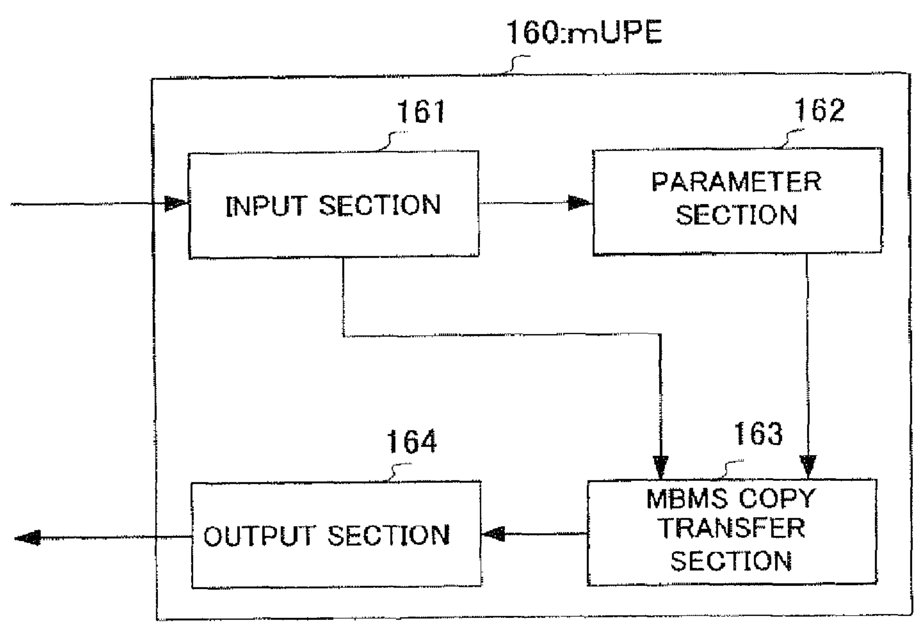
FIG. 6 is a block diagram showing a configuration of the mUPE shown in FIG. 4.

FIG. 6 is a block diagram showing a configuration of mUPE 160 shown in FIG. 4. In FIG. 6, input section 161 outputs control signals received from BM-SC 180, MME 140 and eNB 120 to parameter section 162, and outputs MBMS data received from BM-SC 180 to MBMS copy transfer section 163.

Parameter section 162 manages various parameters related to data paths and outputs control information to MBMS copy transfer section 163 according to the parameter setting. When two or more MBMS bearers of SFN transfer and non-SFN transfer are set for the same service, parameter section 162 requests MBMS copy transfer section 163 to copy the MBMS data and send the copy to the MBMS bearers.

MBMS copy transfer section 163 adds appropriate header information based on the control information reported from parameter section 162, to the MBMS data acquired from input section 161, and outputs the result to output section 164. Upon acquiring control information on a plurality of MBMS bearers from parameter section 162, MBMS copy transfer section 163 copies the received MBMS data, adds a header thereto based on the respective pieces of control information reported from parameter section 162 and outputs the results to output section 164.

Output section 164 outputs the MBMS data outputted from MBMS copy transfer section 163 to eNB 120.

Figure 7:
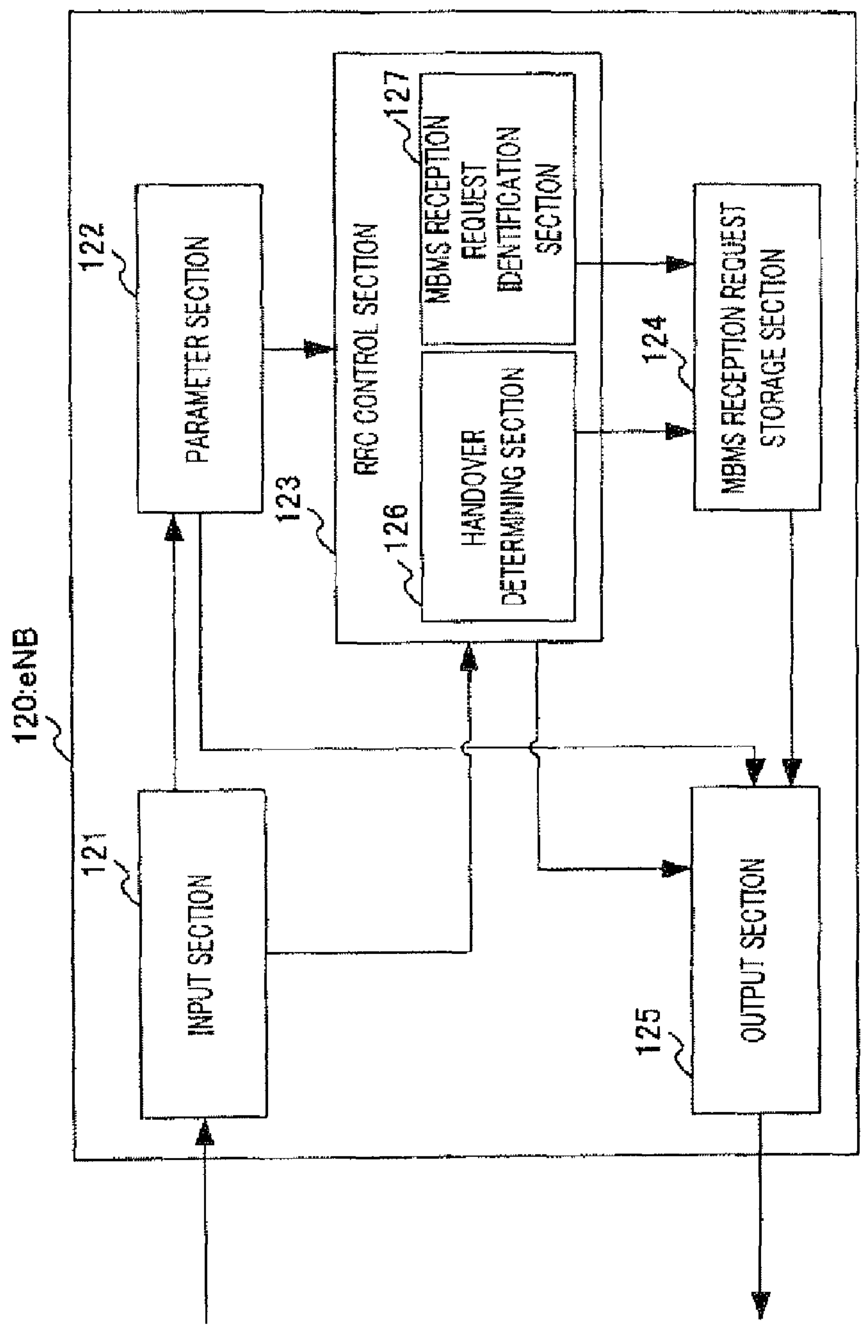
FIG. 7 is a block diagram showing a configuration of the eNB shown in FIG. 4.

FIG. 7 is a block diagram showing a configuration of eNB 120 shown in FIG. 4. In FIG. 7, input section 121 reports signals received from MME 140, mUPE 160 and UE 100 to parameter section 122 and RRC control section 123.

Parameter section 122 manages various parameters related to data paths and sends control information of the MBMS radio bearer corresponding to the MBMS bearer and the MBMS data acquired from mUPE 160 to a radio section via output section 125, according to the parameter setting on the MBMS bearer reported from MME 140. For example, in the case of eNB 120 located in the SFN area, neighboring base stations send MBMS data together in a predetermined time and format. Furthermore, when eNB 120 itself is located on the boundary of the SFN area, parameter section 122 broadcasts control information including information indicating the boundary of the SFN area via output section 125. Furthermore, when an MBMS bearer through non-SFN transfer is established, parameter section 122 reports the completion of establishment thereof to RRC control section 123.

RRC control section 123 includes handover determining section 126 and MBMS reception request identification section 127, and MBMS reception request identification section 127 identifies an RRC message received as input from UE 100 and outputs, when an MBMS reception request is included therein, the MBMS reception request to MBMS reception request storage section 124. Furthermore, when an RRC message from UE 100 includes a neighboring cell received quality measurement result, handover determining section 126 judges whether or not to perform handover to the neighboring cell. When handover is necessary, handover determining section 126 requests MBMS reception request storage section 124 to send the MBMS reception request stored therein. Furthermore, upon receiving a report of establishment of an MBMS bearer for the service requested by UE 100 from parameter section 122, handover determining section 126 outputs a handover instruction to UE 100 via output section 125.

MBMS reception request storage section 124 stores the MBMS reception request outputted from MBMS reception request identification section 127, and, when requested from handover determining section 126 to send the stored MBMS reception request, sends the MBMS reception request to MME 140 via output section 125.

Output section 125 sends, to UE 100, the MBMS data received as input from parameter section 122, information indicating the boundary of the SFN area and the handover instruction outputted from handover determining section 126, and sends the MBMS reception request outputted from MBMS reception request storage section 124 to MME 140.

Figure 8:
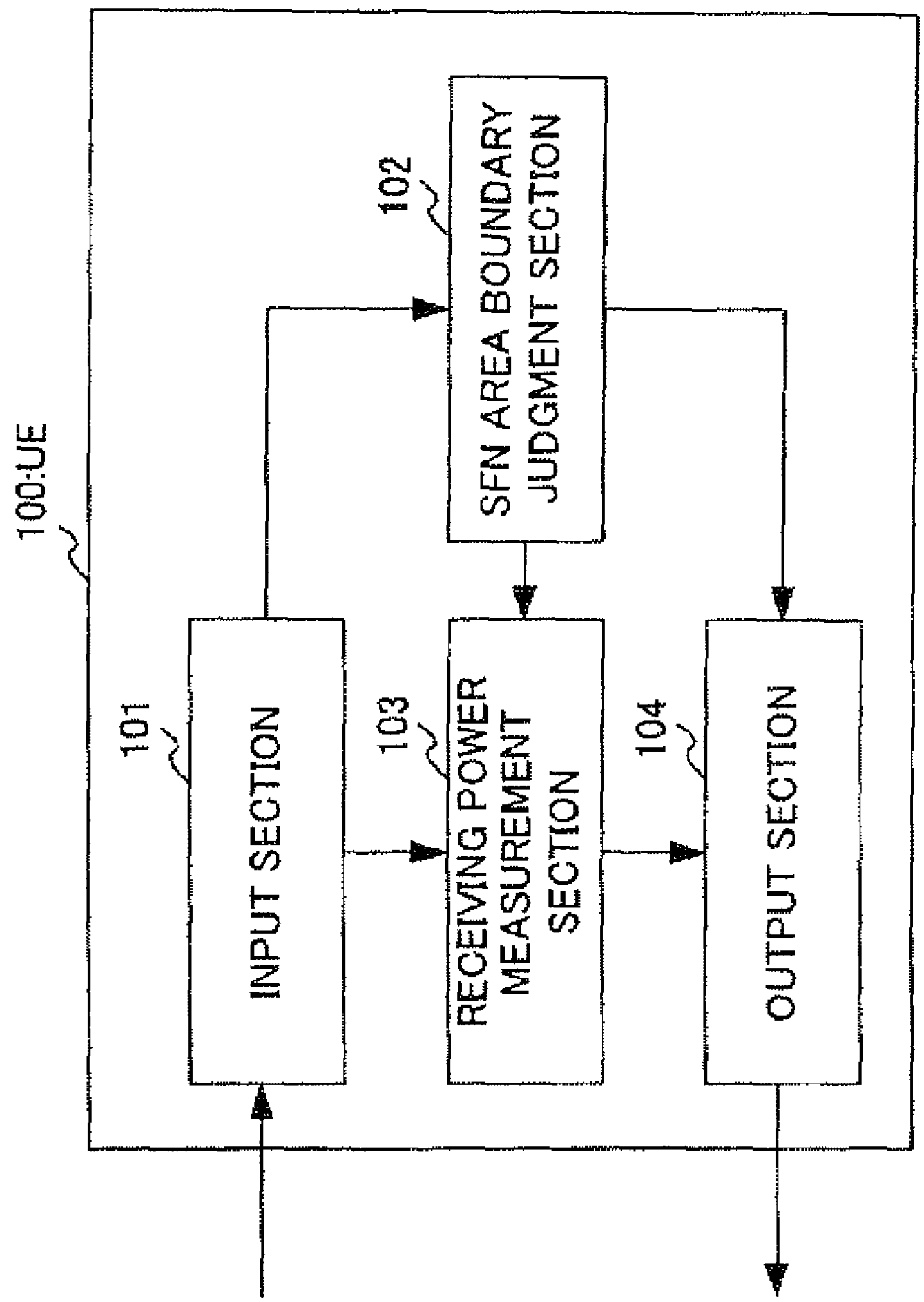
FIG. 8 is a block diagram showing a configuration of the UE shown in FIG. 4.

FIG. 8 is a block diagram showing a configuration of UE 100 shown in FIG. 4. In FIG. 8, input section 101 outputs the signal received from eNB 120 to SFN area boundary judgment section 102 and receiving power measurement section 103.

SFN area boundary judgment section 102 judges whether or not broadcast information transmitted from eNB 120 includes information indicating the boundary of the SFN area. When the broadcast information includes the information indicating the boundary of the SFN area, SFN area boundary judgment section 102 generates an MBMS reception request and sends the MBMS reception request to eNB 120 via output section 104. The MBMS reception request includes a service identifier to identify a desired service.

Receiving power measurement section 103 measures receiving power of each neighboring cell from a reference signal outputted from input section 101, and sends a measurement report including the measured receiving power to eNB 120 via output section 104.

Output section 104 sends the MBMS reception request outputted from SFN area boundary judgment section 102 and the measurement report outputted from receiving power measurement section 103 to eNB 120.

Figure 9:
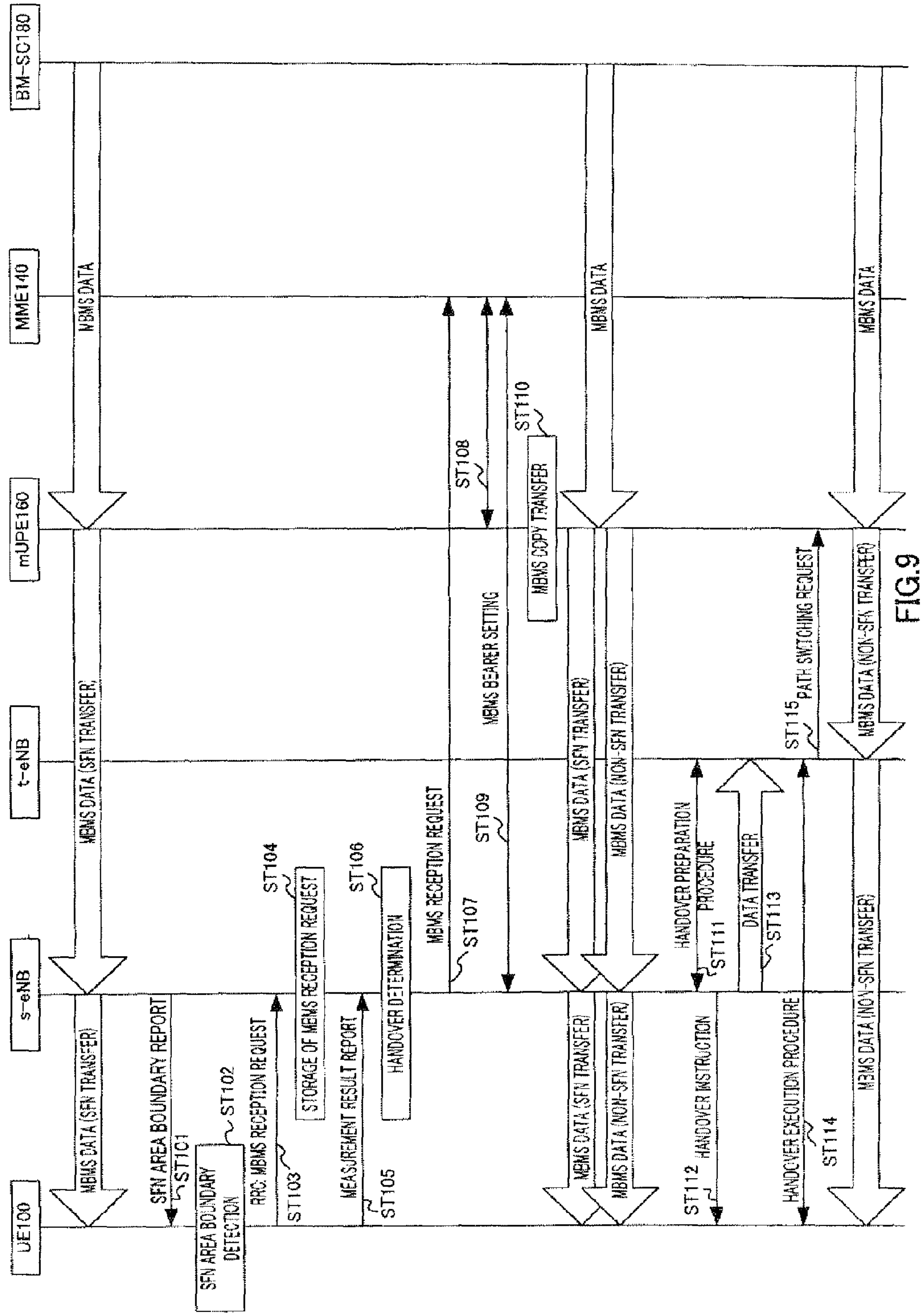
FIG. 9 is a sequence diagram showing a procedure of handover from an SFN area to a non-SFN area.

Next, a procedure of handover from the SFN area to non-SFN area of UE 100 will be explained using FIG. 9. In FIG. 9, in step (hereinafter abbreviated as "ST") 101, UE 100 in an idle state receives a report on the SFN area boundary information from eNB 120 (s-eNB) located on the boundary of the SFN area. The SFN area boundary information includes information indicating the boundary of the SFN area.

In ST102, UE 100 detects from the received SFN area boundary information that UE 100 is approaching the boundary of the SFN area, and, in ST103, UE 100 transits to an active state, establishes an RRC connection with the s-eNB and sends an MBMS reception request including a desired service identifier to the s-eNB.

In ST104, the s-eNB detects that the received RRC message includes an MBMS reception request, and then stores the detected MBMS reception request.

The RRC connection between UE 100 and the s-eNB established in ST103 is limited to a control plane that transmits/receives only control signals. Limiting the RRC connection to the control plane means a state where only the control plane is active, and indicates a state where only entities regarding radio link control ("RLC") on transmission/reception of an RRC message and media access control ("MAC") are provided, and where reporting of channel quality (CQI report) necessary for transmission/reception of user plane data of UE 100 and monitoring of a downlink shared control channel or the like are not performed at all.

The state where only the control plane is active is limited to between the s-eNB and UE 100, and no information is provided to the core network, and therefore the core network continues to manage UE 100 as an entity in an idle state.

Normally, UE 100 in an active state measures the received quality of a neighboring cell and reports the measurement result to the s-eNB periodically or on an event-by-event basis.

Here, suppose UE 100 has moved to the vicinity of the boundary with the neighboring cell. In ST105, UE 100 reports the neighboring cell received quality measurement result to the s-eNB, and, in ST106, the s-eNB detects that UE 100 is located near the boundary with a certain neighboring cell and the s-eNB determines handover of UE 100 to the neighboring cell.

In ST107, the s-eNB transmits the MBMS reception request stored in ST104 to MME 140, and, in ST108 and ST109, MME 140 identifies mUPE 160 from the service identifier included in the MBMS reception request and sets an MBMS bearer between mUPE 160 and the s-eNB.

mUPE 160, which has set an MBMS bearer dedicated to UE 100 with the s-eNB, sends MBMS data transmitted from BM-SC 180 to all eNB's 120 in the SFN area for SFN transfer in ST110 and copies and sends the MBMS data to the MBMS bearer. Furthermore, UE 100 receives desired MBMS data from the newly set MBMS bearer dedicated to UE 100.

The s-eNB having completed the MBMS bearer setting with mUPE 160 through signaling to/from MME 140 performs, in ST111, a normal handover preparation procedure with eNB 120 (t-eNB) that manages the handover destination cell determined in ST106. Here, the handover preparation procedure refers to a procedure for reporting the user plane and control plane context of UE 100 at the source s-eNB to the destination t-eNB and reporting radio parameters or the like of the destination t-eNB to the source s-eNB.

In ST112, the s-eNB instructs UE 100 to perform handover to the t-eNB. This handover instruction includes the radio parameters reported from the t-eNB in ST111.

In ST113, the s-eNB transfers the MBMS data on the MBMS bearer established in ST108 and ST109 to the t-eNB. This allows the service suspension time caused by the handover to be reduced.

In ST114, UE 100 executes a handover execution procedure with the t-eNB. The handover execution procedure is completed when UE 100 sends an RRC message indicating completion of the handover to the t-eNB after connections in layer 1 and layer 2 are established between UE 100 and t-eNB.

In ST115, to switch the MBMS bearer between mUPE 160 and s-eNB established in ST108 to the t-eNB, the t-eNB transmits a path switching request to mUPE 160, and mUPE 160 having received the path switching request switches the MBMS bearer with the s-eNB established in ST108 and ST109 to the t-eNB.

The above processing completes the procedure of handover from the SFN area to non-SFN area of UE 100.

Thus, according to Embodiment 1, eNB 120 stores an MBMS reception request from UE 100 until eNB 120 determines handover of the UE, establishes a UE 100 dedicated MBMS bearer when handover is actually performed, and can thereby shorten the suspension time of the service being received by the UE while reducing the amount of radio resources consumed in the SFN area.

A handover procedure has been explained with the present embodiment using unicast transfer in the non-SFN area as an example, but multicast transfer may also be used in the non-SFN area. In such a case, a join packet indicating joining to a multicast tree, which is set in a transport network between mUPE 160 and eNB 120, is sent instead of the path switching request in ST115.

According to the present embodiment, eNB 120 located on the boundary of the SFN area broadcasts information indicating the boundary of the SFN area, but UE 100 may also be made to spontaneously recognize the boundary of the SFN area based on the received quality of the MBMS data and send an MBMS reception request.

According to the present embodiment, UE 100 that belongs to a cell on the boundary of the SFN area establishes an RRC connection with eNB 120 based on the received SFN area boundary information, but UE 100 may also be made to establish an RRC connection with eNB 120 in consideration of measurement results in the own cell and neighboring cell and send an MBMS reception request to MME 140.

Embodiment 2

A case will be explained with Embodiment 2 of the present invention where, when a UE performs handover from an SFN area to a non-SFN area, a UE dedicated MBMS bearer is directly established between a destination eNB and an mUPE concurrently with the handover of the UE.

When handover is performed after setting the UE dedicated MBMS bearer between a source eNB and the mUPE, the MBMS bearer is expected to become unnecessary for the source eNB soon. Furthermore, though only for a short period of time, radio resources of the source eNB may be consumed for SFN transfer and for non-SFN transfer redundantly. Thus, with the present embodiment, the source eNB transfers an MBMS reception request from the UE storing the request to the destination eNB through a handover preparation procedure.

Figure 10:
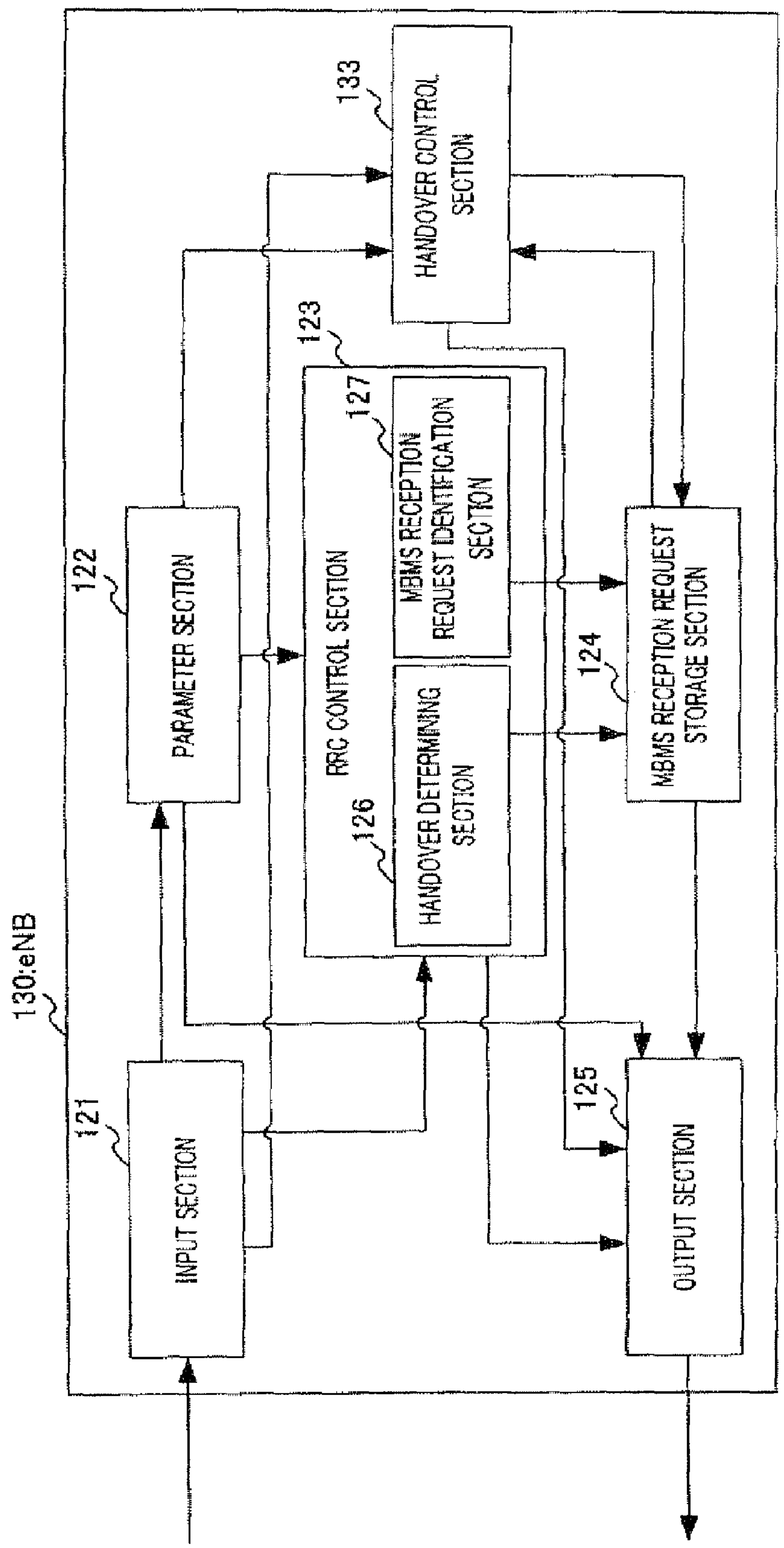
FIG. 10 is a block diagram showing a configuration of an eNB according to Embodiment 2 of the present invention.
Figure 11:
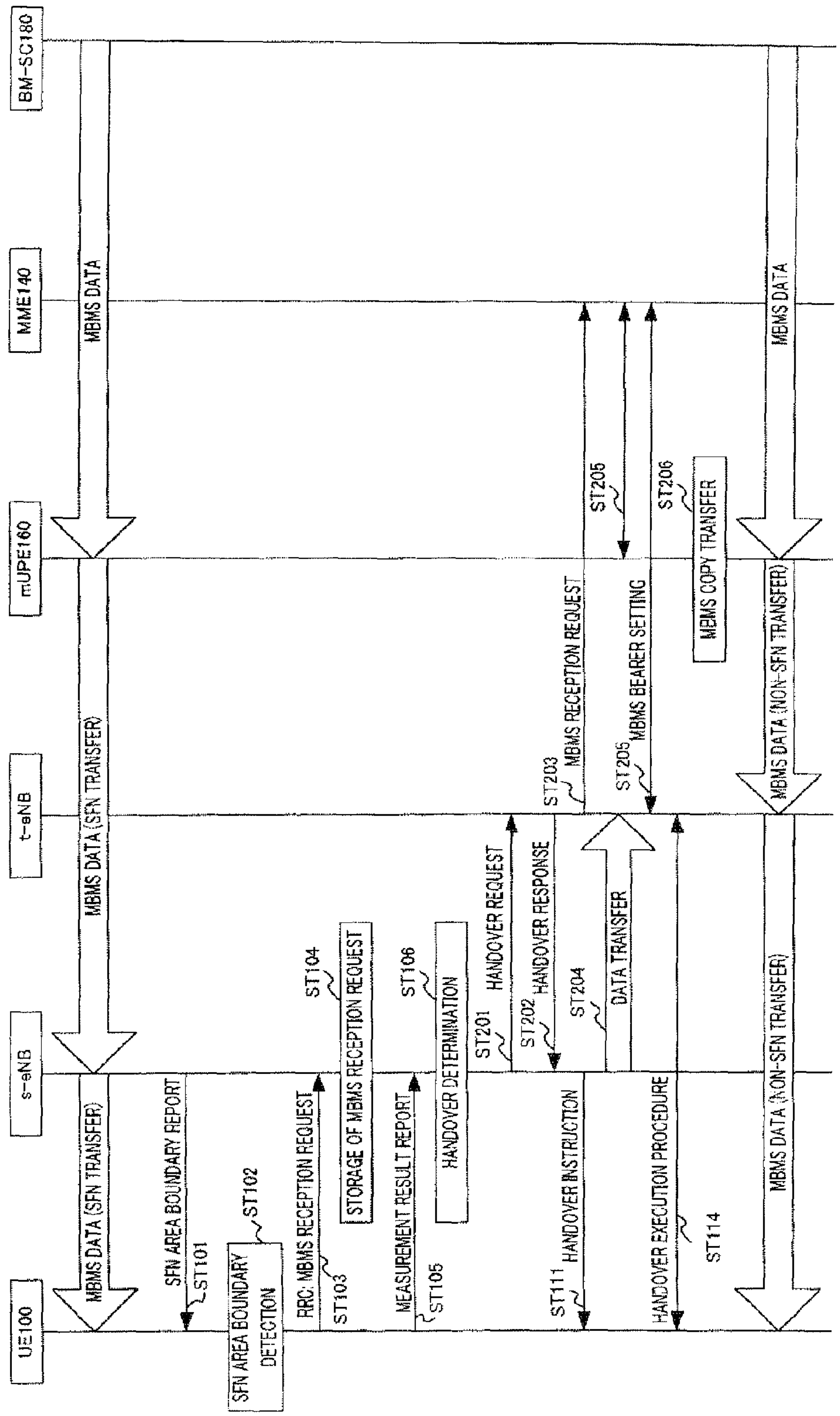
FIG. 11 is a sequence diagram showing a procedure of handover from an SFN area to a non-SFN area according to Embodiment 2 of the present invention.

FIG. 10 is a block diagram showing a configuration of eNB 130 according to Embodiment 2 of the present invention. Furthermore, FIG. 11 is a sequence diagram showing a handover procedure according to Embodiment 2 of the present invention. The handover procedure will be explained below using FIG. 10 and FIG. 11. Here, in FIG. 10 and FIG. 11, the same components as in FIG. 7 and FIG. 9 will be assigned the same reference numerals and their detailed explanations will be omitted.

In ST201, handover determining section 126 of the s-eNB, which has determined handover of UE 100, instructs MBMS reception request storage section 124 to report the MBMS reception request from UE 100 stored in ST104 to handover control section 133. Handover control section 133 transmits a handover request with the MBMS reception request reported from MBMS reception request storage section 124, to the t-eNB. Input section 121 of the t-eNB reports the handover request received from the s-eNB to handover control section 133.

Handover control section 133 judges whether or not the handover request received from the s-eNB includes an MBMS reception request. In the case of normal handover with no MBMS reception request included, handover control section 133 transmits a handover response to the s-eNB via output section 125 in ST202. When the MBMS reception request is included, handover control section 133 transmits a handover response to the s-eNB via output section 125 in ST202 and also requests MBMS reception request storage section 124 to send an MBMS reception request to MME 140.

In ST203, MBMS reception request storage section 124 transmits the MBMS reception request to MME 140 via output section 125, and, in ST204, parameter section 122 of the s-eNB transfers MBMS data of an MBMS bearer for SFN transfer received as input from mUPE 160, to the t-eNB via output section 125.

In ST205, MME 140, which has received the MBMS reception request, identifies mUPE 160 from a service identifier included in the MBMS reception request and sets an MBMS bearer between mUPE 160 and t-eNB.

In ST206, mUPE 160, which has set a UE 100 dedicated MBMS bearer with the t-eNB, sends MBMS data transmitted from BM-SC 180 as MBMS data for SFN transfer to all eNB's 120 in the SFN area and also copies the MBMS data and sends the MBMS data to the MBMS bearer.

In ST114, UE 100, which has completed handover to the t-eNB, receives desired MBMS data from the t-eNB thereafter.

As described above, according to Embodiment 2, a MBMS bearer dedicated to UE 100 is established not from source eNB 130 but from destination eNB 130 concurrently with handover of UE 100, and further source eNB 130 transfers MBMS data on an MBMS bearer for SFN transfer to destination eNB 130 for the period of handover of UE 100, so that it is possible to shorten the time of suspension of the service being received by the UE without consuming radio resources in the SFN area.

Embodiment 3

With Embodiment 3 of the present invention, a case will be explained where, when a UE performs handover from an SFN area to a non-SFN area, the UE requests an MME to suspend the establishment of a UE dedicated MBMS bearer between an eNB and mUPE.

When a source eNB temporarily stores an MBMS reception request from the UE, the eNB consumes memory resources, in which the MBMS reception request is stored, until the eNB determines handover of the UE to an eNB located in the non-SFN area. Moreover, the eNB needs to manage, as a special state, the state of the UE regarding the period between receiving the MBMS reception request from the UE and determining handover, which complicates the state management on the UE by the eNB. Thus, with the present embodiment, the UE includes, in the MBMS reception request, information requesting the MME to suspend the establishment of an MBMS bearer until handover is completed.

Figure 12:
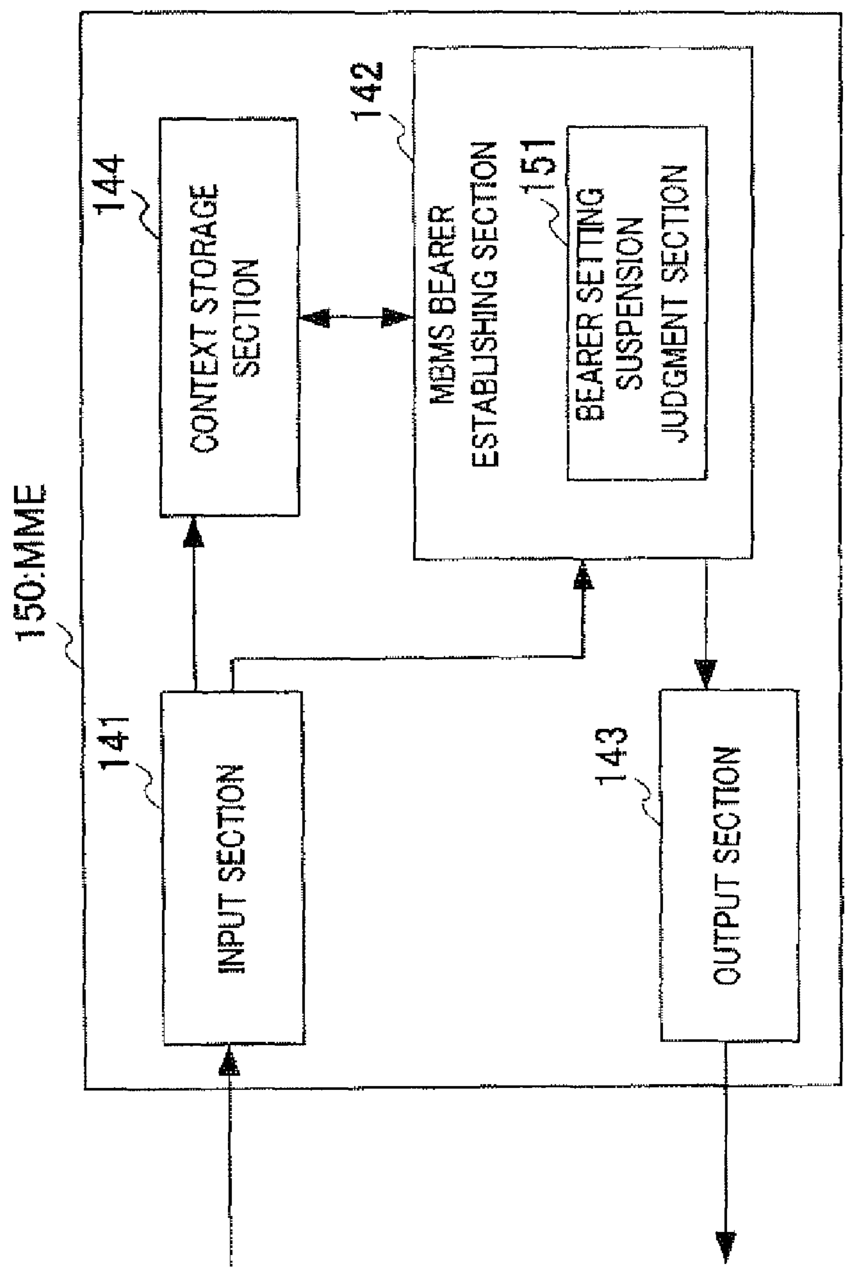
FIG. 12 is a block diagram showing a configuration of an MME according to Embodiment 3 of the present invention.
Figure 13:
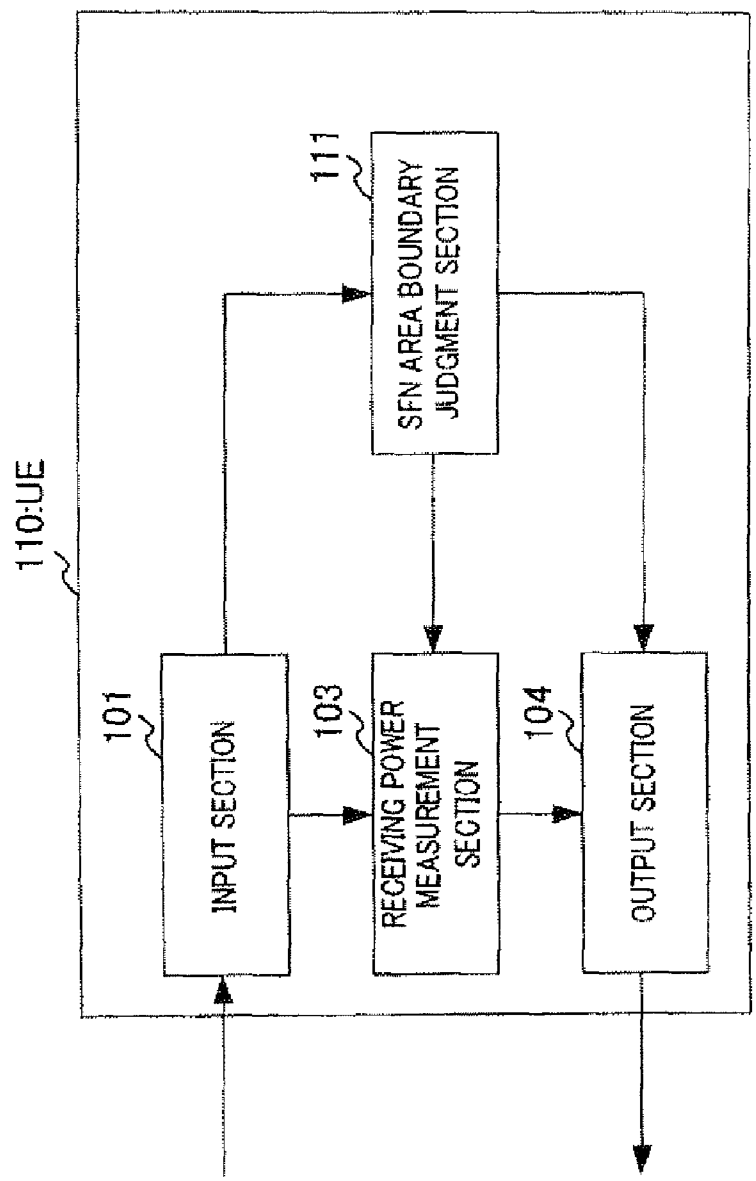
FIG. 13 is a block diagram showing a configuration of a UE according to Embodiment 3 of the present invention.
Figure 14:
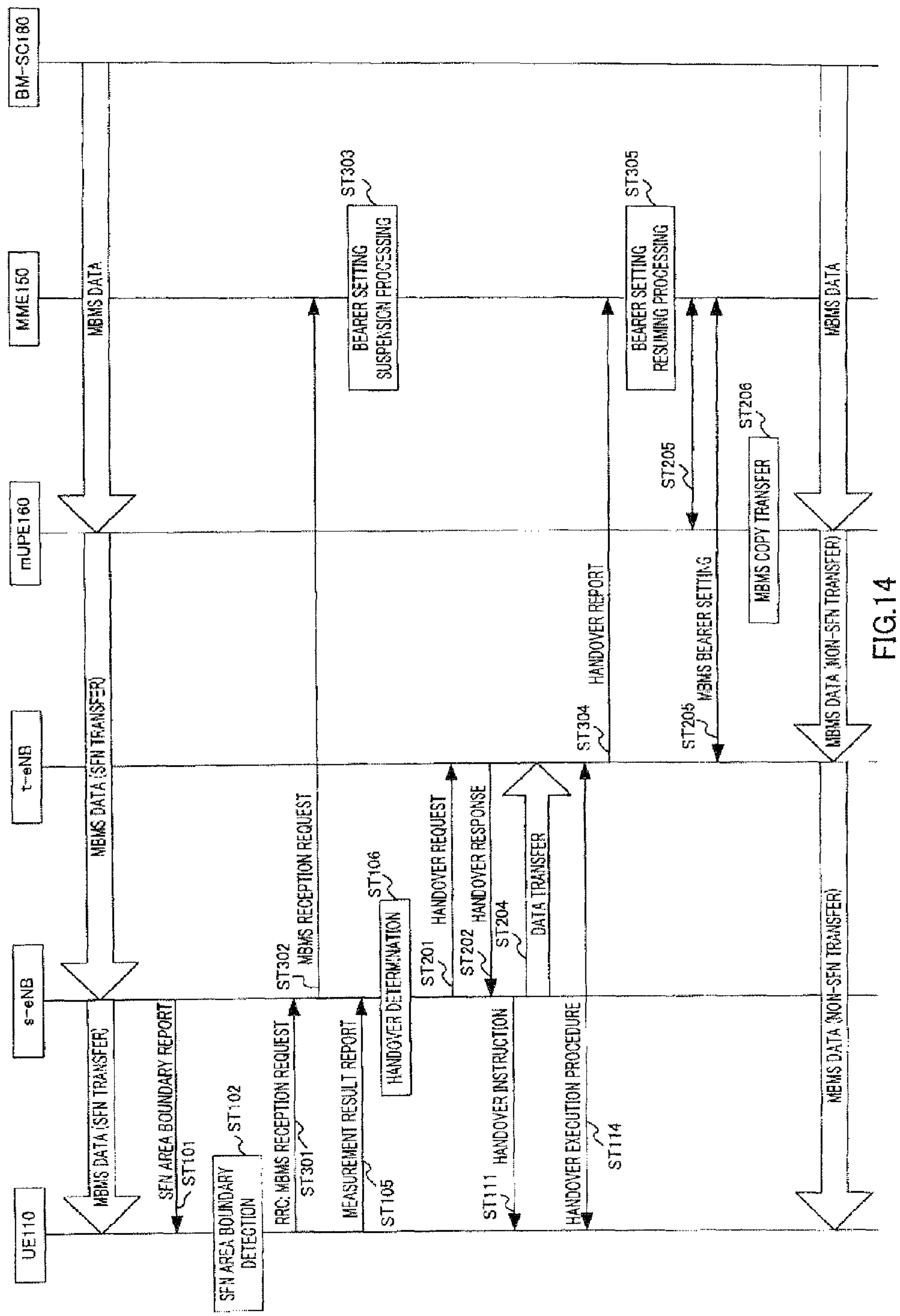
FIG. 14 is a sequence diagram showing a handover procedure according to Embodiment 3 of the present invention.

FIG. 12 is a block diagram showing a configuration of MME 150 according to Embodiment 3 of the present invention. FIG. 13 is a block diagram showing a configuration of UE 110 according to Embodiment 3 of the present invention. Furthermore, FIG. 14 is a sequence diagram showing a handover procedure according to Embodiment 3 of the present invention. The handover procedure will be explained below using FIG. 12, FIG. 13 and FIG. 14. However, in FIG. 12, FIG. 13 and FIG. 14, the same components as in FIG. 5, FIG. 8 and FIG. 11 will be assigned the same reference numerals and their detailed explanations will be omitted.

In ST102 in FIG. 14, when broadcast information transmitted from eNB 120 includes information indicating a boundary of an SFN area, SFN area boundary judgment section 111 generates an MBMS reception request including a service identifier to identify a desired service, a UE identifier to identify UE 110 and information (pending indicator) for requesting suspension of establishment of an MBMS bearer for UE 110 between the s-eNB and mUPE 160.

In ST301, UE 110 sends the MBMS reception request generated to the s-eNB via output section 104.

In ST302, the s-eNB transfers the received MBMS reception request to MME 150 without storing the MBMS reception request.

MME 150 includes context storage section 144. Context storage section 144 stores context on the position of UE 110 and a service to be received, and so on.

MBMS bearer establishing section 142 in MME 150 further includes bearer setting suspension judgment section 151. In ST303, bearer setting suspension judgment section 151 judges whether or not the MBMS reception request from UE 110 received from the s-eNB includes information (pending indicator) for requesting suspension of the establishment of an MBMS bearer for UE 110 between the s-eNB and mUPE 160. If the pending indicator is included, bearer setting suspension judgment section 151 suspends the establishment of the MBMS bearer between the s-eNB and mUPE 160, and stores information (pending indicator) indicating the service identifier and bearer setting included in the MBMS reception request in context storage section 144.

Then, UE 110 then performs handover to the t-eNB, and, when a series of handover steps ends, the t-eNB outputs a handover report to MME 150 in ST304. Here, the handover report includes a UE identifier that indicates UE 110. Furthermore, in the series of handover steps, as described in Embodiment 2, the s-eNB transfers MBMS data on the MBMS bearer for SFN transfer to the t-eNB for the handover period of UE 110.

MME 150 inputs the handover report received from the t-eNB to MBMS bearer establishing section 142. In ST305, MBMS bearer establishing section 142 acquires the context on UE 110 indicated by the UE identifier included in the handover report from context storage section 144. Bearer setting suspension judgment section 151 judges whether or not information (pending indicator) indicating that the bearer setting stored in ST303 is included in the acquired context on UE 110. If the pending indicator is included, MBMS bearer establishing section 142 performs signaling to mUPE 160 and t-eNB via output section 143 so as to establish an MBMS bearer between the t-eNB and mUPE 160.

Thus, according to Embodiment 3, UE 110 includes information requesting suspension of the establishment of an MBMS bearer until handover is completed in the MBMS reception request sent to MME 150, the source s-eNB transfers MBMS data on the MBMS bearer for SFN transfer to the destination t-eNB during the handover period of UE 110, so that it is possible to shorten the suspension time of the service being received by the UE without consuming radio resources in the SFN area. Furthermore, the s-eNB no longer needs to temporarily store the MBMS reception request, so that it is possible to reduce the amount of memory resources used at the eNB and simplify the state management of the UE.

Embodiment 4

In Embodiment 4 of the present invention, a case will be explained where, when a UE performs handover from an SFN area to a small-cell radio communication base station apparatus in a cell having a radius of approximately several meters, called "femto cell," an MME requests an mUPE not to transmit UE dedicated MBMS data between the UE and mUPE.

The 3GPP has studied that a small-cell radio communication base station apparatus may be set up in indoor facilities such as a home, office or restaurant, and that access may be granted only to a limited number of group members. A UE to which access is granted is controlled from a network so as to preferentially establish a connection to the femto cell. That is, when the UE enters the area of the femto cell, the UE is controlled so as to preferentially establish a connection to the femto cell even if the UE can receive radio waves from the eNB.

The femto cell is expected not to be provided with MBMS functions for reasons such as a cost reduction and a backhaul network that does not support IP multicast. Normally, when the UE moves from inside to outside an MBMS service area, a point-to-point bearer is set up between the UE and BM-SC, and an application layer makes a service request and then resumes reception of the MBMS service.

Therefore, when the UE moves to the femto cell and starts establishing the MBMS bearer for the UE, the UE cannot resume receiving the MBMS service until reporting of the service request of the application layer between the UE and BM-SC is completed. Thus, according to the present embodiment, when the destination cell is a femto cell, the UE requests the MME to suspend the establishment of the MBMS bearer and also reports that the femto cell has been detected. The MME requests the mUPE to allow only data (uplink direction) on the service request between the UE and BM-SC to pass, and not to allow MBMS data (downlink direction) directed to the UE via the eNB to pass.

Figure 15:
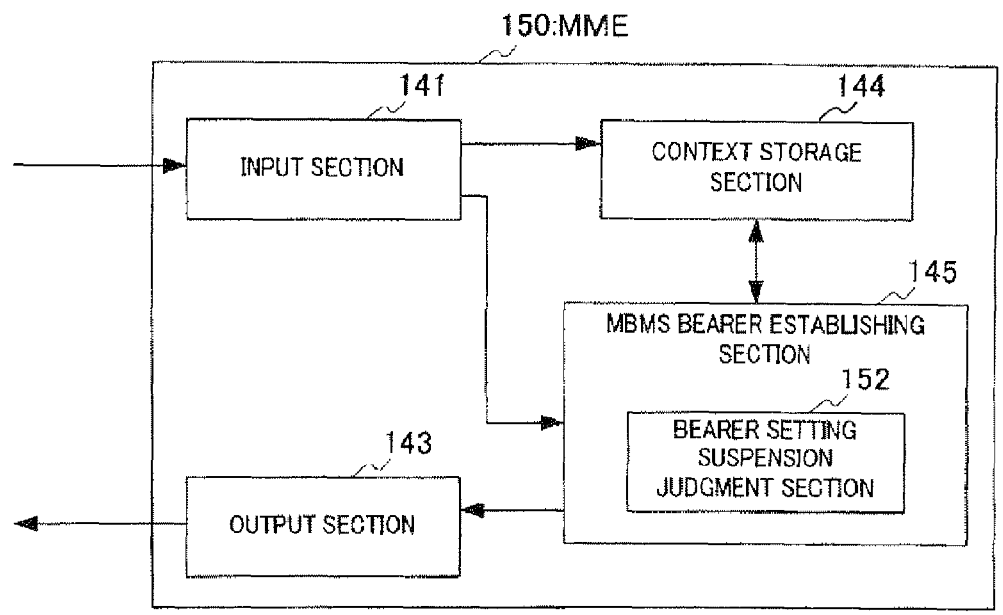
FIG. 15 is a block diagram showing a configuration of an MME according to Embodiment 4 of the present invention.
Figure 16:
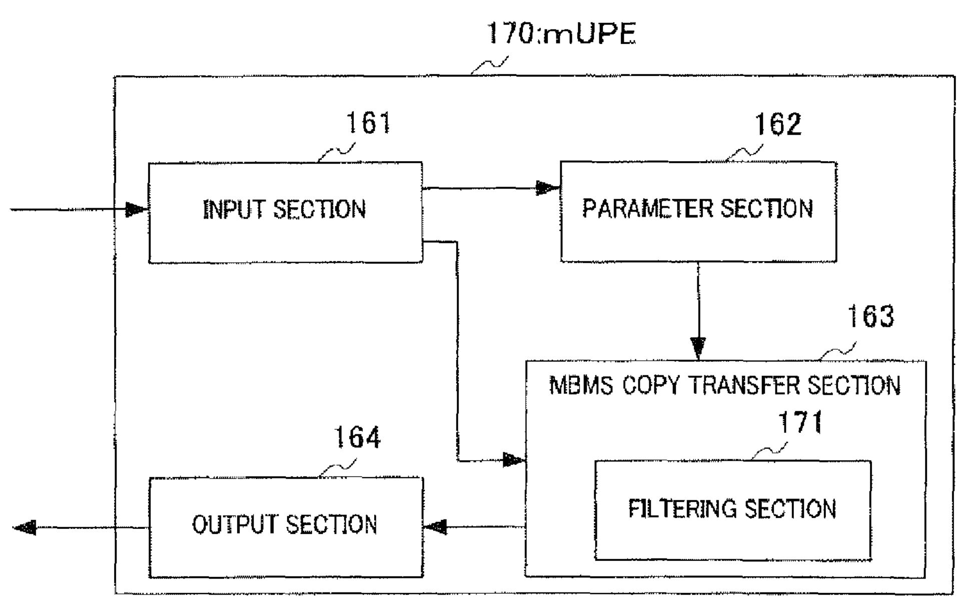
FIG. 16 is a block diagram showing a configuration of an mUPE according to Embodiment 4 of the present invention.
Figure 17:
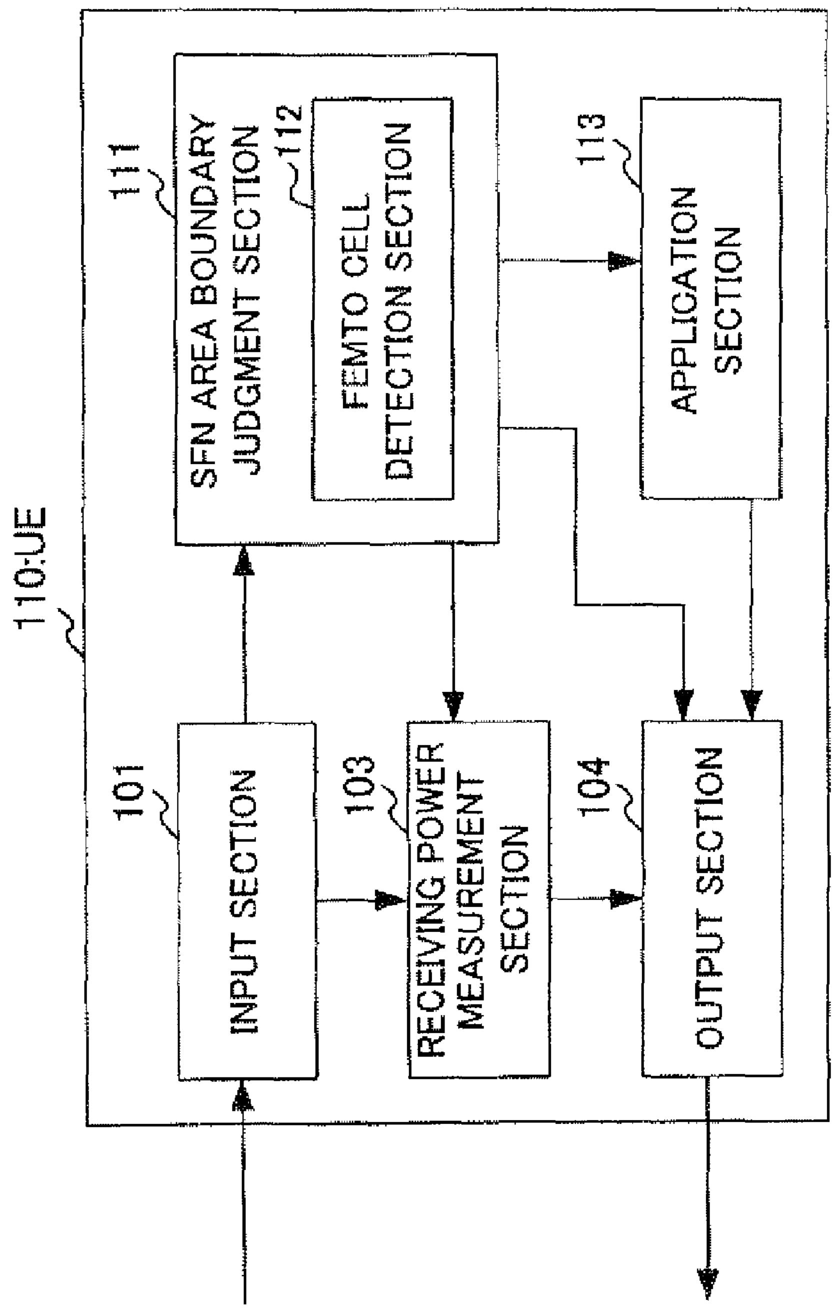
FIG. 17 is a block diagram showing a configuration of a UE according to Embodiment 4 of the present invention.
Figure 18:
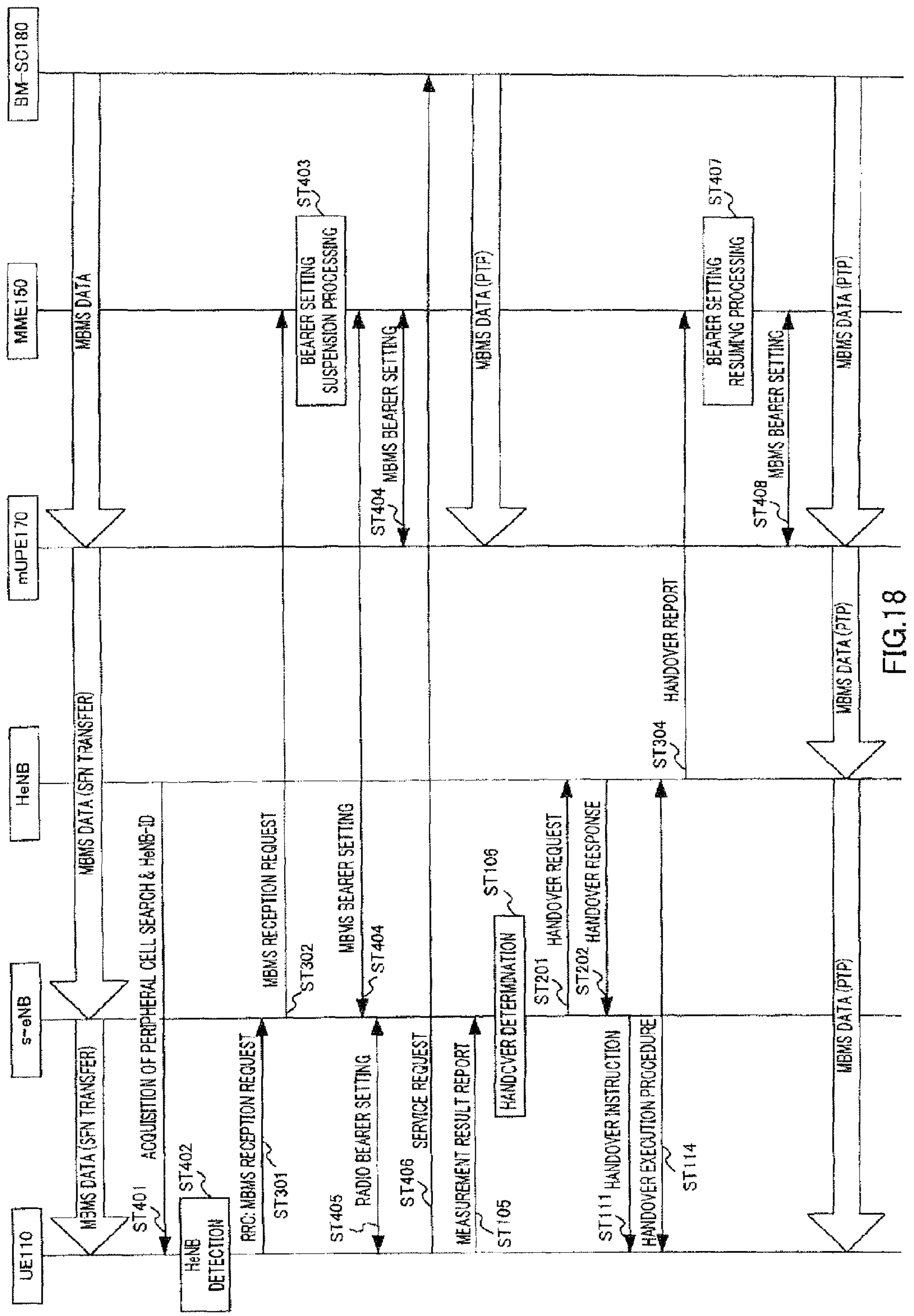
FIG. 18 is a sequence diagram showing a handover procedure according to Embodiment 4 of the present invention.

FIG. 15 is a block diagram showing a configuration of MME 150 according to Embodiment 4 of the present invention. FIG. 16 is a block diagram showing a configuration of mUPE 170 according to Embodiment 4 of the present invention. FIG. 17 is a block diagram showing a configuration of UE 110 according to Embodiment 4 of the present invention. Furthermore, FIG. 18 is a sequence diagram showing a handover procedure according to Embodiment 4 of the present invention. The handover procedure will be explained below using FIG. 15, FIG. 16, FIG. 17 and FIG. 18. However, in FIG. 15, FIG. 16, FIG. 17 and FIG. 18, the same components as in FIG. 6, FIG. 12, FIG. 13 and FIG. 14 will be assigned the same reference numerals and their detailed explanations will be omitted.

In ST401 in FIG. 18, UE 110 performs a peripheral cell search and acquires an HeNB identifier included in broadcast information about the detected femto cell (HeNB). In ST402, UE 110 compares the acquired HeNB identifier with the identifier of HeNB to which access of UE 110 is granted.

SFN area boundary judgment section 111 in UE 110 further includes femto cell detection section 112. In ST402, when the identifier of HeNB to which access of UE 110 is granted is included, femto cell detection section 112 generates an MBMS reception request including a service identifier to identify a desired service, a UE identifier to identify UE 110, information requesting suspension of the establishment of an MBMS bearer for UE 110 between the s-eNB and mUPE 170 (pending indicator) and information indicating that the femto cell has been detected.

Furthermore, UE 110 includes application section 113, and femto cell detection section 112, which has detected the femto cell in ST402, reports to application section 113 to send a service request in the application layer after a radio bearer is established.

In ST301, UE 110 sends the MBMS reception request generated to the s-eNB via output section 104.

In ST302, the s-eNB transfers the received MBMS reception request to MME 150 without storing the MBMS reception request.

In ST403, bearer setting suspension judgment section 152 in MME 150 judges whether or not the MBMS reception request from UE 110 received from the s-eNB includes information requesting suspension of the establishment of an MBMS bearer for UE 110 between the s-eNB and mUPE 170 (pending indicator) and information indicating that the femto cell has been detected. When both are included, bearer setting suspension judgment section 152 decides to establish the MBMS bearer between the s-eNB and mUPE 170 and stores the service identifier and pending indicator included in the MBMS reception request in context storage section 144.

In ST404, MBMS bearer establishing section 145 performs signaling regarding the MBMS bearer setting between the s-eNB and mUPE 170 via output section 143. In this case, MBMS bearer establishing section 145 outputs a filtering request for instructing mUPE 170 to allow a service request in the application layer from UE 110 to BM-SC 180 to pass and not to allow MBMS data from BM-SC 180 to UE 110 started by the service request to pass in the MBMS bearer.

MBMS copy transfer section 163 in mUPE 170 is further provided with filtering section 171 and transfers a filtering request about the MBMS bearer with UE 110 received from MME 150, to filtering section 171. Filtering section 171 performs a filtering setting according to the received filtering request.

In ST405, a radio bearer is set between the s-eNB and UE 110. In ST406, application section 113 in UE 110 outputs a service request in the application layer to BM-SC 180 after the radio bearer is established. In this case, filtering section 171 in mUPE 170 transmits the service request from UE 110 received from input section 161 to BM-SC 180 via output section 164.

When BM-SC 180 completes processing on the service request in the application layer from UE 110, BM-SC 180 starts providing a point-to-point of MBMS data by the bearer to UE 110. In this case, filtering section 171 in mUPE 170 does not transfer the MBMS data for UE 110 to the s-eNB according to the filtering request reported from MME 150 in ST404.

UE 110 then performs handover to HeNB, and, when a series of handover steps ends, the HeNB outputs a handover report to MME 150 in ST304. Through the series of handover steps, the bearer for UE 110 set between the s-eNB and mUPE 170 is moved to between the HeNB and mUPE 170. Furthermore, the handover report includes a UE identifier that indicates UE 110.

MME 150 inputs the handover report received from the HeNB to MBMS bearer establishing section 145. In ST407, MBMS bearer establishing section 145 acquires the context on UE 110 indicated by the UE identifier included in the handover report from context storage section 144. Bearer setting suspension judgment section 152 judges whether the pending indicator stored in ST403 is included in the acquired context on UE 110. When the pending indicator is included, in ST408, MBMS bearer establishing section 145 performs signaling to mUPE 170 so as to transfer MBMS data from the HeNB to UE 110 via output section 143.

Thus, according to Embodiment 4, when the destination cell is a femto cell, UE 110 requests MME 150 to suspend the establishment of the MBMS bearer and reports to MME 150 that the femto cell has been detected, and MME 150 requests mUPE 170 to allow only a service request (uplink direction) in the application layer between UE 110 and BM-SC 180 to pass and not to allow MBMS data (downlink direction) directed to UE 110 via the s-eNB to pass and starts a transfer of the MBMS data to UE 110 via the HeNB after UE 110 actually performs handover to the HeNB, so that it is possible to shorten the suspension time of the MBMS service being received by UE 110 without consuming radio resources in the SFN area.

Although cases have been described with the embodiments above where the present invention is configured by hardware, the present invention may be implemented by software.

Each function block employed in the description of the aforementioned embodiment may typically be implemented as an LSI constituted by an integrated circuit. These may be individual chips or partially or totally contained on a single chip. "LSI" is adopted here but this may also be referred to as "IC," "system LSI," "super LSI" or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2007-077777, filed on Mar. 23, 2007 and Japanese Patent Application No. 2007-107038, filed on Apr. 16, 2007, including the specifications, drawings and abstracts, are incorporated herein by reference in their entirety.

INDUSTRIAL APPLICABILITY

The radio communication base station apparatus and radio communication method according to the present invention can shorten, when a UE performs handover from an SFN area to a non-SFN area, the suspension time of a service being received by the UE while suppressing the amount of radio resources consumed in the SFN area, and is applicable to a transmission control system that provides an MBMS.

The invention claimed is:

1. A radio communication base station apparatus comprising:

a storing section that stores a multimedia broadcast/multicast service ("MBMS") reception request transmitted from a user; and a handover determining section that judges whether or not to perform a handover from a single frequency network area of the user to a non-single frequency network area, and, when it is judged that the handover is to be performed, sends the stored MBMS reception request to a core network, wherein the storing section stores the MBMS reception request transmitted from the user until the handover determining section has determined that the handover is to be performed.

2. The radio communication base station apparatus according to claim 1, further comprising a handover control section that sends a handover request with the MBMS reception request directed to the core network, to another neighboring radio communication base station apparatus.

3. A radio communication method comprising:

storing a multimedia broadcast/multicast service ("MBMS") reception request transmitted from a user in a radio communication base station apparatus; and judging whether or not to perform a handover from a single frequency network area of the user to a non-single frequency network area, and, when it is judged that the handover is to be performed, sending the stored MBMS reception request to a core network, wherein the MBMS reception request is stored by the radio communication base station apparatus until it is judged that the handover is to be performed.

* * * * *